United States Patent [19] [11] 3,750,758
Bancel [45] Aug. 7, 1973

[54] FARMING IMPLEMENT FOR RIDGING
[76] Inventor: Joseph Emmanuel Bancel, Les Premices, Bourg-Argental, France
[22] Filed: June 7, 1971
[21] Appl. No.: 150,396

[30] Foreign Application Priority Data
Nov. 13, 1970 France..........................7041638

[52] U.S. Cl.................... 172/58, 172/108, 172/177, 37/92
[51] Int. Cl............................................ A01b 33/00
[58] Field of Search.......................... 172/58, 63–64, 172/107–109, 112, 176, 122, 177, 554, 527, 556; 37/91–93, 21, 43 B

[56] References Cited
UNITED STATES PATENTS
| 2,746,180 | 5/1956 | Ficken | 172/108 |
| 3,261,117 | 7/1966 | Shoemaker et al. | 37/92 |
| 1,331,641 | 2/1920 | Helms | 172/109 |
| 3,375,879 | 4/1968 | Troyer et al. | 172/122 |
| 3,624,826 | 11/1971 | Rogers | 172/108 |

FOREIGN PATENTS OR APPLICATIONS
| 1,266,516 | 12/1961 | France | 172/58 |
| 662,316 | 4/1964 | Italy | 172/122 |
| 24,426 | 3/1914 | Norway | 172/58 |
| 65,843 | 3/1956 | France | 172/58 |
| 1,195,925 | 11/1959 | France | 172/58 |
| 1,008,512 | 5/1957 | Germany | 172/58 |
| 216,979 | 6/1957 | Australia | 37/92 |

Primary Examiner—Robert E. Pulfrey
Assistant Examiner—Eugene H. Eickholt
Attorney—Waters, Roditi, Schwartz and Nissen

[57] ABSTRACT

This tractor-hauled implement is intended essentially for forming a pair of parallel trenches and at the same time, between these trenches, a ridge, notably for cultivating asparagus, and comprises to this end non-adjacent or outermost longitudinal shafts emerging from a casing and carrying rotary tools revolving in opposite directions and comprising each a plurality of cutters and a plurality of shovel-forming blades so as to cut the soil and throw the clods towards the centre of the implement ; a pair of ploughshares or coulters are disposed ahead of each tool for loosening the soil before said tools : a vertically adjustable transverse plate permits breaking the apex of the ridge thus formed and a longitudinal vertical, plate is disposed between the tools for acting as a double-faced deflector.

7 Claims, 3 Drawing Figures

FARMING IMPLEMENT FOR RIDGING

FIELD OF THE INVENTION

The present invention relates to farming implements and has specific reference to an implement of the type adapted to be pulled by a tractor and connected to the power take-off thereof for achieving predetermined operations, notably the formation of ridges extending in the direction of travel of the tractor and implement assembly.

DESCRIPTION OF THE PRIOR ART

As a rule, agricultural implements of the type broadly set forth hereinabove comprise a plurality of parallel shafts extending longitudinally in the direction of motion and revolving by pairs in opposite directions; these shafts are provided at their rear ends with tools adapted to cut and dig the soil while performing the clearing of ground undergrowth and possibly the hidding of wastes in the ground.

These implements are frequently used, inter alia, for digging two parallel trenches while forming therebetween a ridge, this type of soil work being necessary for cultivating asparagus, for instance.

In fact, it is known that the cultivation of asparagus is very particular and requires a careful preparation of the soil. In winter and during the first weeks of spring the ground must be perfectly flat and smooth to permit the growth of young asparagus shoots as running or creeping roots.

On the other hand, from the very first days of its evolution asparagus must be covered with a relatively loose, specially prepared earth characterized by a fine granulometry, of the sandy ground type, so that the plants can pass through ridges or slopes about 23 inches to 32 inches high while remaining white and soft.

According to current practice these ridges are formed in a scarcely rational and satisfactory manner by using superposed ploughs requiring several successive operations or passes.

SUMMARY OF THE INVENTION

It is the essential object of the present invention to provide means whereby this soil working process can be performed in a single and same operation, i.e. in a single pass, by converting in a specific manner a standard equipment of the type broadly set forth hereinabove.

To this end, the present invention consists in equipping the end or outermost shafts, or two non-adjacent shafts, revolving in opposite directions (the remaining shafts being inoperative), with rotary tools designed with a view to cut the soil and throw the clods of earth towards the other tool, so as to dig during each pass two parallel grooves or trenches while forming a ridge therebetween.

Thus, by simply replacing the tools normally equipping implements of this type these may be adapted simply and rapidly to the formation of ridges for the cultivation of asparagus.

According to a specific form of embodiment of the aforesaid tools each of them comprises a hollow cylindrical drums having a horizontal axis and formed with a bottom wall provided with means for mounting and securing said drum to one of the pair of tool carrier shafts, the cylindrical wall of said drum carrying at spaced intervals a plurality of cutters and shovel-like blades, the combined action of which is adapted to break up and loosen the earth, and to subsequently throw it towards the central portion of the equipment for building up the desired central ridge.

In order to improve the efficiency of the arrangement according to this invention, among the cutters carried by each tool those diametrally opposite are longer than the others.

The shovel-like blades consist each of a metal plate disposed in a plane containing the axis of rotation of the corresponding drum and in close vicinity of the rear edge of said drum, their free ends being bent in the direction of rotation of the tool by an angle of about 10° to 30° to constitute a shovel.

In order to reinforce the assembly and improve its stress resistance the blades are mutally coupled by means of tie-rods extending tangentially to the outer cylindrical wall of the tool, a weld spot being formed at the points of contact between these tie-rods and said cylindrical wall.

Preferably, interchangeable wearing tips are provided at the working end of these blades.

On the other hand, in order to break the apex of the ridge formed by the implement a levelling plate of substantially rectangular configuration, carried by a pair of brackets rigid with the frame structure of the implement and disposed at a suitable level behind the rotary tools, is also provided.

This plate is adjustable in the vertical direction and its operative edge, i.e. its lower horizontal edge, carries detachable vertical points adapted to harrow the flat strip thus formed on the ridge top.

Besides, to facilitate the work of the rotary tools a pair of vertically adjustable ploughshares or coulters are provided ahead of the implement and substantially in the vertical plane containing the longitudinal axis of said tools, for the purpose of pre-cutting the ground parallel to the direction of travel of the implement.

Furthermore, to prevent the earth from being thrown beyond the median line of the ridge being formed there is provided in the vertical axial plane of the implement a vertical plate parallel to the direction of travel of the implement, and adapted to act as a double-faced screen or deflector.

On the other hand, in order to project the shafts of the intermediate tool carriers revolving loose during the operation of the implement, each one of these inoperative shafts is enclosed in a protection sheath or tube of corresponding cross-sectional shape and size.

BRIEF DESCRIPTION OF THE DRAWINGS

In order to afford a clearer understanding of the present invention a typical form of embodiment thereof will now be described in detail with reference to the accompanying drawing showing diagrammatically by way of example but not of limitation the arrangement according to this invention for forming ridges in the particular case of asparagus cultivation. In the drawings.

DESCRIPTION OF THE PREFERRED EMBODIMENT

Figure 1:
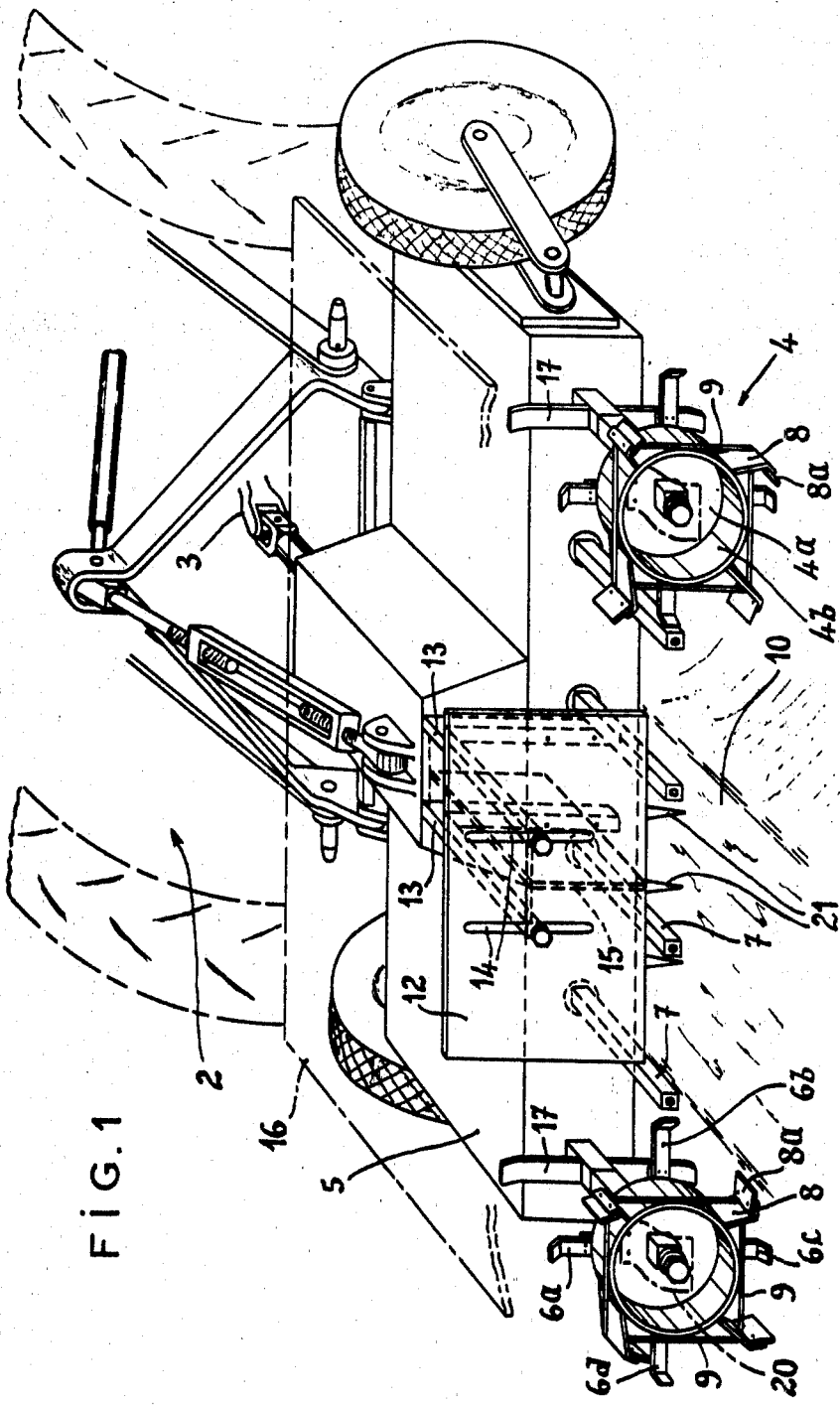
FIG. 1 is a perspective rear view showing the implement equipped with the tools necessary for the application contemplated.
Figure 2:
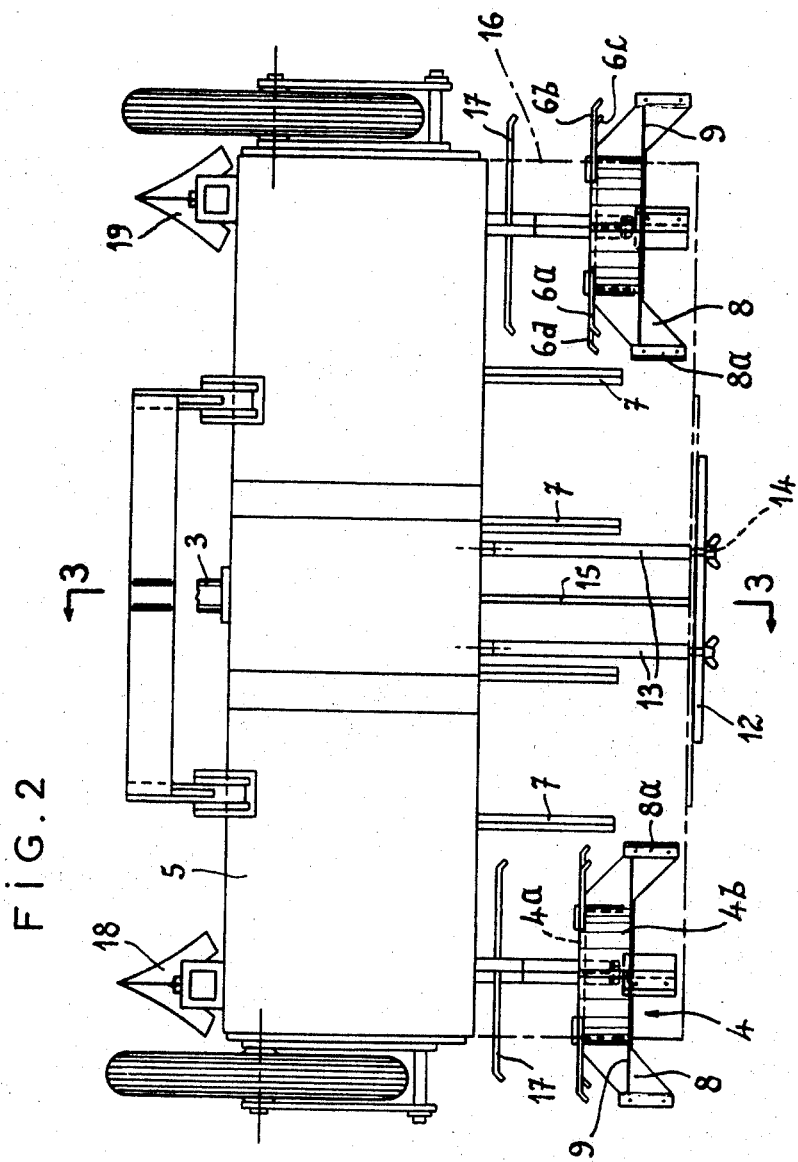
FIG. 2 is a plane view from above of the same implement.
Figure 3:
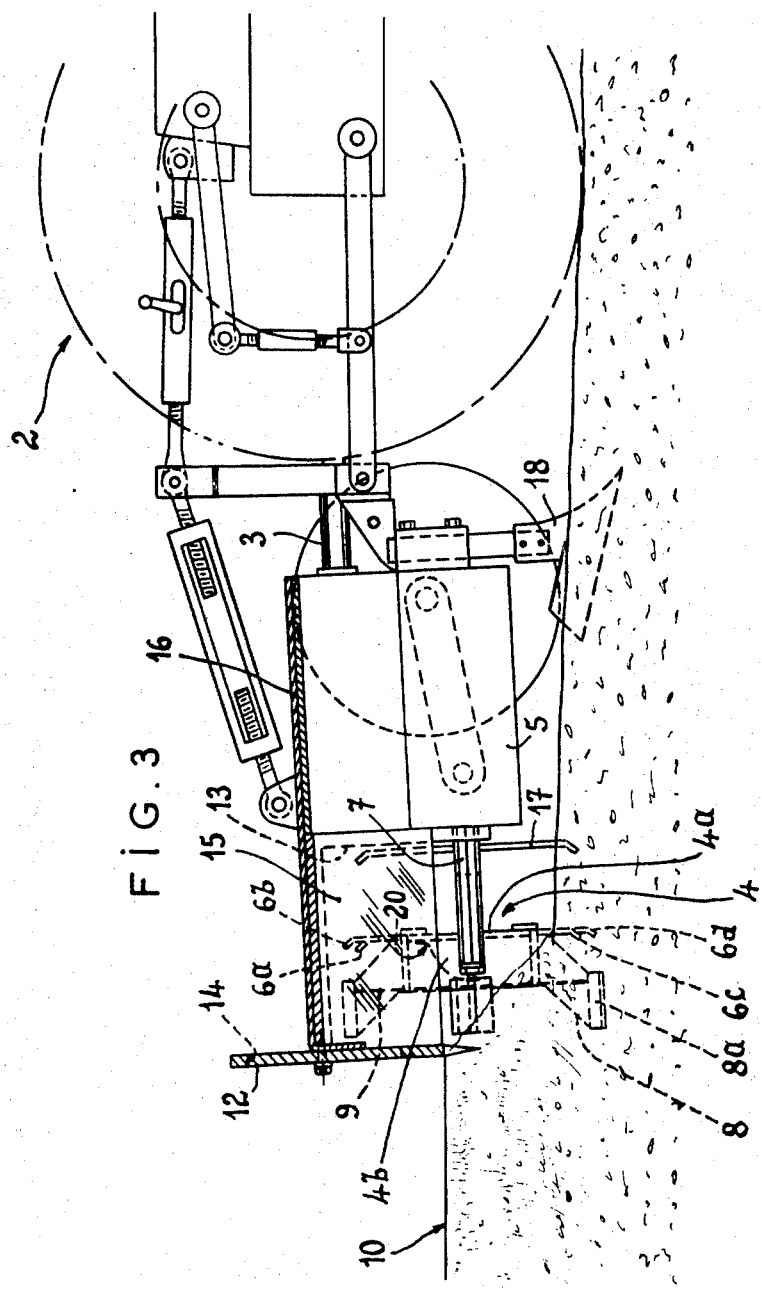
FIG. 3 is a side elevational and part-sectional view of the same implement, the section being taken along the line 3—3 of FIG. 2.

As shown in FIG. 1 the implement consists of a mechanical unit adapted to be drawn by a tractor 2 and having its movable or operative members adapted to be driven from the power take-off 3 of the tractor.

This implement comprises a tight mechanical casing 5 in which suitably driven gears are adapted to transmit the torque to an even number of shafts 7 having one end protruding from the rear end of the casing. In the specific form of embodiment illustrated the implement comprises six shafts 7.

According to the present invention the outermost shafts 7 which, according to a known feature of these implements, revolve in opposite directions, are each provided with a rotary tool or wheel 4.

Each wheel 4 comprises a hollow cylindrical drum having a bottom wall 4a through which extend in a central or axial position a metal tube or socket perpendicular to said bottom wall 4a and having a cross-sectional configuration matching that of shafts 7 to permit the mounting of the wheel concerned.

The cylindrical wall 4b of each wheel 4 carries on its outer surface four cutters 6a, 6b, 6c and 6d extending radially at a 90° circumferential spacing from each other, in the vicinity of the front edge of said wall 4b; the diametrally opposite cutters 6a, 6c being shorter than the other cutters 6b, 6d. The aforesaid wall 4b further comprises four blades 8 also spaced 90° apart between said cutters and disposed close to the rear edge of wall 4b. These blades consist each of a metal plate disposed in a plane containing the axis of rotation of the relevant wheel.

The free end of each blade 8 is bent in the direction of rotation of the tool by which it is carried, at an angle within the range of about 10° to about 30°, so as to constitute shovels adapted to pick up and throw the clods cut by said cutters. These blades are rigidly coupled through tie-rods 9 disposed tangentially to the outer wall 4b of the relevant tool, a weld spot being formed at each point of tangence therebetween.

The assembly constitutes a rotary tool adapted to be easily and rapidly mounted to one of the end or outermost shafts of the implement and having a sufficient rigidity.

These wheels 4 are rotatably driven and adapted, as the implement travels forwards, to cut the earth by means of their cutters 6a to 6d, then scraping and throwing the earth towards the median or center line of the implement where it accumulates to form a ridge 10.

Thus, as it travels on a smooth and flat ground the implement digs two longitudinal trenches parallel to each other and to the direction of travel of the implement, and at the same time the earth thus removed forms a central ridge 10 particularly suited for cultivating asparagus.

However, the crest or apex of the ridge thus formed must be broken up. This is obtained by providing a vertical plate 12 extending transversely to the direction of travel of the implement and carried by a pair of brackets 13 rigid with the frame structure of the implement.

This plate 12 is vertically adjustable by means of a pair of elongated vertical slots 14 formed therein and engaged by a pair of screws engaging tapped holes formed at the ends of the horizontal arms of the corresponding brackets. Moreover, the lower horizontal edge of this plate is provided with vertical points 21 adapted to harrow the top face of the ridge thus obtained.

On the other hand, to prevent the projection of clods beyond the central portion of the ridge, another vertical plate 15 is disposed in the median longitudinal vertical plane of the implement and carried likewise by the pair of brackets 13. This plate 15 extends downwards substantially to the level of the axes of the tool carrier shafts 7 and acts as a double-faced deflector.

The action exerted by this plate 15 is completed by that exerted by another plate 16 covering horizontally the complete implement and substituted for the conventional casing.

To facilitate the operation of the tools carried by the wheel 4 and according to a complementary feature of this invention a cutter tool 17 consisting of a pair of diametrally opposed cutting blades carried by a each one of the outermost shafts 7, ahead of the wheels 4.

In order to further improve the efficiency of these tools a pair of ploughshares or coulters 18, 19 are mounted at the front of the implement, substantially in alignement with the outermost shafts 7 supporting the tools, in order to effect a preliminary cutting or breaking up of the soil.

Advantageously, the operative portion of each blade 8 consists of a pair of interchangeable wearing knives, or edge pieces 8a secured to the free end of the blade by means of bolts.

Moreover, to avoid the unnecessary wear of the inoperative intermediate shafts 7, each of them is covered with a sheath-forming tube of corresponding cross-sectional contour. These tubes, like the wheels 4, are secired by means of bolts and these are screwed with the interposition of a washer of suitable diameter into the ends of the relevant shafts 7 formed to this end with tapped axial holes.

In order to protect the heads of the screws provided for securing the wheels 4, the latters comprise across said heads a protection plate 20 secured to the bottom wall 4a of said wheels.

Of course, this invention should not be constructed as being strictly limited to the specific form of embodiment shown and described herein, which refers more particularly to an implement for preparing the soil in view of cultivating asparagus ; it is clear that many modifications and variations may be contemplated in the practical embodiment thereof without departing from the basic principles of the invention as set forth in the appended claims.

What I claim as new is:

1. An agricultural implement for being hauled by a tractor and comprising, emerging from a casing, a plurality of longitudinal parallel shafts revolving by pairs in opposite directions, driven from a common gearing actuated in turn from a power take-off of the tractor, wherein only an outermost pair of said shafts, or two non-adjacent ones of said shafts, revolving in opposite directions, are provided with rotary tools for breaking and cutting the soil and throwing clods towards each other, so as to dig during each pass a pair of parallel trenches and form a ridge therebetween, wherein said rotary tools consist of cylindrical hollow drums having horizontal axes and being provided with bottom walls having means for positioning and securing said drums to a respective one of the tool-supporting shafts, the cylindrical walls of said drums carrying at spaced intervals on their outer peripheries a plurality of cutters and a plurality of shovel-forming blades, said cutters and said blades being so arranged that their combined action loosens the soil and throws the same towards a central portion of the implement for forming the ridge, wherein diametrally opposite ones of said cutters, carried by said rotary tools, are longer than the others, and wherein said blades are interconnected by tie-rods tangent to the outer cylindrical walls of said tools, a weld spot being formed at each point of contact between said tie-rods and said cylindrical walls.

2. The agricultural implement as defined in claim 1, wherein said blades consist of metal plates disposed in planes containing the axes of rotation of said drums and, in the vicinity of the rear ends thereof, the free ends of said plates are bent in the direction of rotation of said tools at an angle within the range of about 10° to 30°, to constitute shovel-like members.

3. The agricultural implement as defined in claim 1, further comprising interchangeable wearing blades provided at the operative ends of said plates.

4. The agricultural implement as defined in claim 3, further comprising a levelling plate of substantially rectangular configuration, carried by a pair of brackets rigid with a frame structure of the implement, and disposed at a certain level behind said rotary tools.

5. The agricultural implement as defined in claim 4, wherein said levelling plate is vertically adjustable and its operative edge, that is, its lower horizontal edge, is provided with vertical points for harrowing the horizontal surface thus formed at the top of said ridge.

6. The agricultural implement as defined in claim 5, further comprising, ahead of the implement and substantially in a vertical plane containing the longitudinal axes of said rotary tools, a pair of vertically adjustable plough-shares or coulters for performing a preliminary cutting of the soil parallel to the direction of travel of the implement.

7. The agricultural implement as defined in claim 6, further comprising a vertical plate parallel to the direction of travel of the implement, disposed in the axial plane thereof, to act as a double-faced deflector.

* * * * *